United States Patent Office 3,293,231
Patented Dec. 20, 1966

3,293,231
METHOD FOR PROVIDING INCREASED YIELDS OF HIGHLY CRYSTALLINE ALPHA OLEFIN POLYMERS
Robert J. Turbett, Millington, N.J., assignor to Union Carbide Corporation, a corporation of New York
No Drawing. Filed Jan. 28, 1963, Ser. No. 254,449
3 Claims. (Cl. 260—93.7)

This invention relates to method for providing increased yields of highly crystalline alpha olefin polymers using organo-metallic olefin catalyst systems characterized by exceptional retention of catalytic properties and a surprising ability to produce such polymers substantially completely free of wholly amorphous fractions. The invention further relates to a novel organo-metallic catalyst suspension capable of greatly increasing and in some instances doubling or more the yield of highly crystalline alpha olefin polymers.

K. Ziegler has described the preparation of high molecular weight polymers of olefinically unsaturated hydrocarbons by contacting the monomer with a mixture of an organo-aluminum compound and a compound of a metal of groups IVb, Vb, or VIb of the periodic table.

These catalysts have heretofore been produced by the reaction in an inert solvent medium of the organo-aluminum compound and the metal halide to form an insoluble complex as a precipitate, which is the catalyst. This precipitate is ordinarily in a finely divided condition.

These finely divided catalysts are characteristically sensitive to atmospheric contamination. In addition they appear to be inherently unstable. A typical catalyst is a hydrocarbon insoluble complex of titanium tetrachloride and triisobutyl aluminum prepared in a heptane medium. The rapid decline in catalytic activity of this typical Ziegler catalyst has been documented recently by A. Orzechowski, J. Polymer Sci. 34, 74–5 (1959). The data appearing in Table I following on yield of polyethylene after periods of aging in an inert atmosphere is taken from the Orzechowski article. The gram polymer/gram catalyst data are calculated from the Orzechowski article. Aging in each instance is the elapsed time between placing of the catalyst in the polymerization vessel and introduction of ethylene into the vessel.

TABLE I

| Catalyst Age, (min.) | Yield of Polyethylene (g.) | Gram Polymer/gram Catalyst |
| --- | --- | --- |
| 0 | 10.5 | 240 |
| 1–2 | 6.5 | 148 |
| 15 | 1.9 | 43.3 |
| 30 | 0.2 | 4.5 |
| 30 | 0.1 | 2.3 |

It can be seen from Table I that after only 1 to 2 minutes 40% of the original catalyst activity had been lost, after 15 minutes 84% had been lost and after 30 minutes 98 to 99% had been lost. These data reflect the inherent instability of conventionally prepared transition metal halide alkyl aluminum catalyst complexes in even inert atmospheres.

As a result of this poor stability these catalysts have heretofore had to be freshly prepared for each polymerization. This, of course, is inconvenient and costly. Consequences of using partially inactivated catalyst include low yields of polymer and undesirably high concentrations of catalyst residue in the polymer obtained.

It is one object, therefore, of the present invention to provide transition metal halide-organo-aluminum catalyst systems which are substantially unaffected in catalytic activity by aging for extended periods, even at elevated temperatures.

It is another object to provide a method for the production of highly crystalline polymers of olefinically unsaturated hydrocarbons wherein high polymerization rates and minimal catalyst residues are achieved.

Heretofore, it has been known to prepare $\alpha$-olefin polymers, described as being "highly crystalline" by contacting an $\alpha$-olefin with catalytic amounts of a complex of a trialkyl or triaryl aluminum compound, e.g. triisobutyl aluminum or triphenyl aluminum and a lower valent transition metal halide e.g. $\alpha$-titanium trichloride. The crystalline content of these olefin polymers is greater than olefin polymers otherwise prepared but even these polymers are still invariably contaminated with a substantial amount, say from 5 to 50% by weight of wholly amorphous polymer i.e. polymer which is totally devoid of any crystallinity. This grease-like polymerization product is detrimental to the overall physical properties of the so-called "highly crystalline" $\alpha$-olefin polymer. For example, the wholly amorphous fraction will not bear a load and the mechanical properties of the polymer are thus reduced. Also, wholly amorphous polymer sweats out causing sticky, unattractive surfaces on shaped contours. Poor solvent resistance is a further consequence of the presence of a wholly amorphous fraction. Crystalline $\alpha$-olefin polymer is essentially insoluble at temperatures below the crystalline melting temperature but wholly amorphous $\alpha$-olefin polymers tend to be quite soluble in a great variety of organic solvents.

Removal of the wholly amorphous fraction, e.g. by extraction with diethyl ether can ameliorate these difficulties but this separation is a costly and tedious undertaking. After the amorphous fraction is removed there remains what can be termed a "residue product." This residue product, despite the extractions, has only moderate crystallinity, in fact crystallinity too low for many commercially important applications where the very highest levels of crystallinity are required, for example, the spinning of fibers.

Product quality problems are not the only disadvantages accruing from polymerizations producing a wholly amorphous polymer fraction. Processing difficulties also arise. Particularly difficult are liquid phase polymerizations conducted at temperatures below the crystalline melting temperature of the polymer. In this process the product desirably is obtained as a slurry of polymer particles in the reaction vehicle and the viscosity of the reaction mass (polymer/catalyst slurry) is substantially the viscosity of the reaction vehicle. The presence of wholly amorphous polymer, however, which is readily soluble in the reaction vehicle, greatly increases the viscosity of the slurry and complicates subsequent handling operations.

It is a further object, therefore, of the present invention to provide method for producing highly crystalline $\alpha$-olefin polymers which are substantially completely free of wholly amorphous fractions.

It is another object to provide transition metal halide-organo aluminum catalyst systems which are capable of producing highly crystalline $\alpha$-olefin polymers substantially completely free of wholly amorphous fractions.

It is a primary object to provide transition metal-halide-organo-aluminum catalyst systems with improved catalytic effectiveness and unreduced ability to produce highly crystalline $\alpha$-olefin polymers substantially completely free of wholly amorphous fractions. It is another object to provide $\alpha$-olefin polymers substantially completely free of wholly amorphous fractions without post polymerization extraction.

Finely divided organo-metallic catalysts exhibiting high initial activity and great resistance to deterioration by aging which produce highly crystalline α-elefin polymers can be prepared by reacting together, under continual high speed agitation providing heat producing fluid shear, a fluid transition metal halide and a fluid organo-aluminum compound to produce a super finely divided, inert liquid hydrocarbon insoluble precipitate; and subsequently contacting the precipitate thus obtained with a hydrocarbon aluminum monohalide co-catalyst free of aliphatic unsaturation in an amount sufficient to render the precipitate catalytically active.

Most surprisingly, the crude, unextracted α-olefin polymers produced with these catalysts exceed in crystallinity, melting point, and mechanical properties not only the crude α-olefin polymers made by conventional trialkylaluminum-titanium trihalide catalysts but completely unexpectedly even these α-olefin polymers after successive extractions with diethyl ether, pentane, hexane and heptane. The prior art α-olefin polymers contain a practically unremovable wholly amorphous fraction which is inimical to good polymer properties. The polymers produced with the above catalysts are substantially completely free of wholly amorphous polymer ab initio obviating costly extractions and providing directly a superior polymer.

As a matter of convenience, the polymerization of alpha olefins with the foregoing catalysts, as with other organo-metallic catalysts known to the art, is generally accomplished in the presence of an inert diluent. The common experience has been that the particular diluents employed is not critical to the polymerization process and hence selection of diluent has been made on the basis of factors such as cost, availability and ease of separation, which are extraneous to the polymerization process per se. For example, in U.S. Patent 3,032,511 issued May 1, 1962 to A. W. Langer and E. Tornqvest, catalysts prepared from groups IV and V metal halides and aluminum alkyls are used as catalysts for olefin polymerization in the presence of diluents ranging from aliphatic hydrocarbons through hydroaromatic hydrocarbons to and including aromatic hydrocarbons. The equivalency of different types of inert diluents such as hydrocarbons has thus been indicated to be the case with catalysts prepared with trihydrocarbon aluminum compounds and halides of metals of groups IV to VII.

It has now been discovered, however, that when a dialkyl aluminum monohalide is used as the sole co-catalyst in the catalyst described herein the choice of inert diluent is made highly critical. In particular, it has now been found that yields of highly crystalline alpha-olefin polymer from polymerization employing dialkyl aluminum monohalides can be significantly increased by the use as an inert diluent, of an inert aromatic compound free of aliphatic unsaturation which is liquid under the polymerization conditions.

Among the liquid inert aromatic compounds found useful as diluents in the present invention are mononuclear aromatic compounds either unsubstituted such as benzene, an alkyl substituted mononuclear aromatic compound such as toluene, xylene and durene, cumene, halogen, i.e., fluorine, chlorine and bromine substituted mononuclear aromatic compounds such as fluorobenzene, chlorobenzene, bromobenzene, o-dichlorobenzene, o-chlorotoluene; polynuclear aromatic compounds such as hydroaromatic compounds, e.g., Tetralin, alkyl substituted Tetralin, and aromatic halogen substituted hydroaromatic compounds. Preferred inert aromatic diluents have melting points below about 80° C.

Numerous advantages accrue from the use of the above diluents. Among others is the fact that although ordinarily the use of a dialkyl aluminum monohalide instead of a trihydrocarbon aluminum compound as a co-catalyst causes a five-fold drop in catalyst productivity, in the diluents of this invention the loss in catalyst productivity is greatly minimized being reduced to only half its former value. This is shown in the following table.

TABLE II

| Example | A | B | C |
| --- | --- | --- | --- |
| Solvent | Heptane | Heptane | Toluene |
| TiCl₃, mmole | 3.70 | 5.02 | 2.01 |
| AlEt₃, mmole | 17.7 | | |
| AlEt₂Cl, mmole | | 15.92 | 6.3 |
| Yield, g | 118.65 | 31.51 | 27.9 |
| Yield, g./mmole TiCl₃ | 32.3 | 6.28 | 13.9 |
| Percent ether soluble | 23.1 | 0 | 2.1 |

[1] Each polymerization carried out for 2.5 hours at 40° C. and 8 p.s.i. pressure in the presence of 1.5 liters of the solvent.

Increased yield provides benefits in lower cost of polymer in terms of catalyst consumption as well as in terms of less elaborate working procedures being required to remove the catalyst.

Moreover, the increase in yield obtained in the present polymerization method surprisingly does not cause a concomitant rise in amorphous polymer content of the polymerization product or a decrease in the molecular weight of the polymer.

The important benefits of the present method are not realized where a trihydrocarbon aluminum compound is used in addition to or in place of the dialkyl aluminum monohalide.

The organo-metallic polymerization catalysts mentioned above are super-finely divided precipitates consisting of highly geometrically uniform, essentially spheroidal particles. Precipitates obtained under the hereinafter set forth preferred conditions of shear producing agitation have an average particle size diameter between 200 and 300 Angstroms with no appreciable number of particles greater than 500 Angstroms in diameter. The geometry of these particles is unlike crushed or ground organo-metallic complex precipitates which are sharp edged and irregular. The particles obtained herein are rounded and essentially uniform and are, therefore, not prone to agglomeration.

A Ziegler catalyst precipitate prepared in the manner of this invention surprisingly retains catalytic properties for many days, weeks or months rather than for only a few minutes as with the same catalysts only conventionally prepared. Mere stirring type agitation or no agitation at all, such as presently practiced in the art, provides Ziegler catalysts inferior in activity, both initially and after aging, to those of this invention. For example, the catalytic life of a typical Ziegler catalyst, a reaction product of titanium tetrachloride and triisobutyl aluminum is greatly multiplied by use of the method of this invention. As shown in Table I above, after only 30 minutes of aging at 50° C. the catalyst was reduced one hundred-fold in productivity from 240 to 2.3 grams polymer/gram catalyst. In contrast to this, a catalyst prepared from these reactants under the shear agitation herein described had a productivity after 20 days of room temperature aging, (⅔ of a month at 25° C.) and then being heated at 125° C. in an inert atmosphere for 30 minutes of over 300 grams of polymer per gram catalyst. In comparison, a catalyst prepared from these components by Orzechowski had a maximum productivity of only 240 grams of polymer per gram of catalyst without any aging and this productivity declined a hundred-fold in 30 minutes.

Not only is the above described catalyst system more stable than Ziegler catalyst systems heretofore known, but it also enables preparation of highly crystalline polymers of α-olefins which are substantially completely free of wholly amorphous fractions. These highly crystalline α-olefin polymers therefore are superior in mechanical properties e.g. load-bearing properties, are adapted to spinning into fibers, have exceptional solvent resistance at temperatures below their melting point temperature and do not undergo sweat-out.

The difference in wholly amorphous polymer fraction content between the α-olefin polymer of the prior art and α-olefin polymers herein produced is pointed up by comparative extraction tests. Polypropylene prepared with a heretofore known trialkyl aluminum-α-titanium trichloride catalyst contains from 10 to 30% by weight of wholly amorphous polymer as determined by exhaustive extractions with boiling diethyl ether in a jacketed Sohxlet extractor. Polypropylene prepared with a hydrocarbon aluminum monohalide treated trialkyl aluminum-α-titanium trichloride precipitate catalyst of this invention when thus exhaustively extracted loses only about 2 percent by weight or less.

The above data are even more significant when it is considered that the above 2 percent maximum wholly amorphous polymer fraction figure includes the amorphous portions soluble in the reaction vehicle. Inclusion of such amorphous polymer in calculating crystallinity contrasts with the normal practice in the art where the mother liquors are discarded and the already once extracted polymer is extracted and these last results are the ones presented to show crystallinity. Because the solubility of the wholly amorphous fractions in the reaction vehicle has been overlooked by the art and this material thrown away in the usual polymer work-up, many estimates of crystallinity have been uncritical and overly optimistic. The scale of possible error by this omission is indicated hereinafter.

The agitation during reaction necessary to the catalyst preparation can be achieved with numerous combinations of vessels and agitating means known to the art. High speed impellers and rotating vented cones are preferred types of agitating means. Any apparatus capable of producing fluid shear sufficient to give a heat output of at least 10 calories per minute per liter of agitated fluid in the reaction system is suitable. Preferred apparatus will accomplish the requisite calorie output more rapidly by providing a higher speed fluid shear in the system. This agitation is basically simply a fluid shear. Shear is present in all agitated vessels to some degree, for example in stirred reactors although the reaction mass rotates with the agitating means, some shearing occurs at the interface of the vessel wall and the moving reaction mass. This is not a fluid shear. To obtain fluid shear it is essential to provide an agitation pattern in a fluid mass such that portions of the mass are in frictional, sliding contact with other portions of the mass. "Fluid shear" as used herein refers to this internal sliding frictional contact between like liquid masses as distinguished from external sliding frictional contact between unlike masses i.e. vessel walls and reaction mass. The inevitable incident of shear is friction and this means production of heat. A convenient index of the quality of shear or the degree of friction being obtained is the amount of heat produced. It is to be emphasized that the preparation of the catalyst is no wise dependent upon some critical temperature being achieved in the reaction vessel. Rather the heat differential induced by shear agitation in the reaction vessel between the start of the reaction and the end of reaction is what is important. The desirable catalyst products described above are produced when the agitation in the reaction vessel is sufficient to give an output of 10 calories per minute per liter of agitated fluid. Calorie output is easily determined by multiplying the heat rise obtained in the particular agitated fluid, e.g. the reaction solvent, times, the volume and times the specific heat thereof. Since the reaction to form the catalyst is exothermic, it is best to ascertain prior to carrying out the catalyst preparation whether a particular vessel and agitating system will produce sufficient shear, e.g. by agitating the proposed reaction solvent only.

Then having established that minimum shear at least is obtained in a particular vessel catalyst preparation can be carried out without constant measurement of shear development.

Alternatively quality and quantity of shear can be compared with a bench mark of a 5° C. rise at steady state over ambient temperature obtained when agitating 500 milliliters of heptane in an insulated vessel under substantially adiabatic conditions.

As pointed out in the paragraph next above, fluid shear is essential. Therefore the reactants, the transistion metal halide and the organo-aluminum compound, must both be in the fluid state. Thus, reaction can be effected where the reactants are gaseous fluids or liquid fluids. Liquid fluidity is preferred for convenience in handling the reactants and the product. Liquid fluidity is achieved by using normally liquid reactants (i.e. at room temperature) or by dissolving normally solid reactants in a suitable inert organic solvent or mixture of solvents such as are well known in the art. The two reactants can be dissolved in the same or different solvents. One reactant can be placed in the reaction vessel as a solution and the other can be in the undissolved but liquid state.

It is preferred to dissolve the reactants whether they be liquids or not in an inert organic liquid selected from the class of aromatic and saturated aliphatic hydrocarbons and halogenated aromatic hydrocarbons which are solvents for the reactants but which do not dissolve the reaction product. Specific classes of such solvents include saturated aliphatic and alicyclic hydrocarbons such as alkanes and cycloalkanes e.g. heptane and cyclohexane, aromatically unsaturated hydrocarbons, such as benzene, alkyl substituted aromatically unsuarted hydrocarbons such as toluene, and halogen substituted aromatically unsaturated hydrocarbons, such as dichlorobenzene.

As the transition metal halide there can be used in this invention compounds having the formula

$$MO_aX_b$$

wherein M is a transition metal selected from groups IVb, Vb or VIb of the Deming periodic table (Handbook of Chemistry and Physics, 30th ed. page 312) for example, Ti, Zr, HF, V, Ni, Ta, Cr, Mo, and W; and having a valence z greater than III in the compound $MO_aX_b$; O is oxygen and X is a halogen; b is an integer having a value of from 2 to z; and a is an integer equal to $z-b/2$ and has a value of 0 or greater. Thus the term "transition metal halide" as used herein includes metal halides and metal oxyhalides. Particularly desirable metal compounds in this invention are titanium tetrachloride, vanadium oxychloride and chromium oxychloride.

As indicated above the catalysts herein are the result of a two stage preparation. In the first stage, the transition metal halide is reduced from its initial valence to a lower valence. This reduction effects a change in the transition metal halide from soluble to insoluble in the reaction medium and high shear agitation is essential throughout because the primary chemical effect of this stage is a reduction in valence.

The particular organo-aluminum compound is not critical and can be one or more of the compounds having formula

$$AlR_mY_{3-m}$$

wherein R is a hydrocarbon radical free of aliphatic unsaturation such as alkyl e.g. ethyl, propyl, and butyl, or aryl e.g. phenyl; m is a number greater than zero and not more than 3; and Y is a halogen i.e. a fluoro, chloro, bromo or iodo group.

The proportions of the compound $MO_aX_b$ and $AlR_mY_{3-m}$ in the first stage are not narrowly critical. As a minimum there should be used a sufficient amount of the aluminum compound to reduce the valence of substantially all the atoms of the transition metal, M to less than IV and preferably to between and including II and III.

As a maximum there can be used an amount of aluminum compound up to but not including that amount which will leave no divalent or trivalent atoms of the transition metal M. It will be noted from the above-given description of the compound $MO_aX_b$ the valence of M, termed there "z" was "greater than III" in the compound $MO_aX_b$. Valence of M in any specific compound will, of course, be an integer but it is contemplated in this invention that mixtures of more than one metal halide or mixtures of metal halides wherein the metal exists in different valence states in the two compounds can be used provided the average valence for the transition metal is greater than III. Where there is but one metal halide present to react with the organo-aluminum compound the term z will equal IV or more. Average valence of the transition metal in a particular reaction system can be calculated from the data provided by an analysis of the reaction system according to the method of E. G. Tabakova and Z. V. Soloveva, Zavodskaya Lab. 22, No. 12, 1417 (1956).

The quantity of aluminum compound necessary to reduce the valence state of substantially all transition metal atoms to less than II is in the first instance dependent on the number of transition metal reactive groups i.e. hydrocarbon groups bound to the aluminum. For that reason, it is usual to consider the "hydrocarbon equivalents" of the aluminum compound rather than moles of aluminum compound in calculating proportions of catalyst reactants. It is easily seen that triethyl aluminum has 3 hydrocarbon equivalents, diethyl aluminum monochloride 2 hydrocarbon equivalents and so forth.

As stated, in carrying out the first stage of the catalyst preparation it is essential to reduce the valence of substantially all the atoms of metal M to less than IV. The reaction of the hydrocarbon aluminum compound with the transition metal halide proceeds by first reducing the valence of the transition metal from its valence in the compound $MO_aX_b$ (z in the formula above) to III. When the valence is at III the transition metal halide precipitates and the reaction mixture becomes two phase. For the first stage reaction to valence III, there is used one hydrocarbon equivalent for each valence above III. Thus, for example, to reduce $TiCl_4$ to $TiCl_3$ one hydrocarbon equivalent is added, reducing the valence of Ti from IV to III. Similarly where M has a valence of V, e.g. V in $VOCl_3$, II hydrocarbon equivalents is sufficient. And where M has a valence of VI, e.g. Cr in $CrO_2Cl_2$, III hydrocarbon equivalents is sufficient.

Use of excessive amounts of aluminum compound results in overreduction of the transition metal, ultimately to the metal itself. In general, a maximum of 30 equivalents of hydrocarbon per equivalent (i.e. mole) of metal halide should be observed. Very careful reaction and closely controlled low temperatures are necessary to avoid overreduction when using greater than 30 equivalents of hydrocarbon per equivalent of metal. Where reaction temperature is above about 100° C. it is desirable to lower the number of hydrocarbon equivalents below 30 progressively as temperatures used rise above 100° C.

In the second stage, the insoluble lower valent transition metal halide resulting from the first step is rendered catalytically active by contacting with additional amounts of certain organo aluminum compounds. It is this contacting stage which is absolutely essential to the obtaining of highly crystalline α-olefin polymers.

Although a wide variety of co-catalysts are taught in the art for this catalytic activation, it is only with a particular class of organo aluminum compounds that catalysts which are capable of producing the very highest crystalline content polyolefins can be prepared.

The members of this class are hydrocarbon aluminum monohalides free of aliphatic unsaturation. These compounds have the general formula $$Al(R_p)_2G$$

wherein $R_p$ is a hydrocarbon radical free of aliphatic unsaturation such as alkyl e.g. preferably having from 1 to 10 carbon atoms methyl, ethyl, propyl, isopropyl, butyl, isobutyl, decyl and the like; aryl e.g. phenyl, alkaryl and aralkyl preferably having from 6 to 10 carbon atoms e.g. phenylethyl, tolyl, xylyl and the like; and G is a halogen, i.e. a fluoro, bromo, iodo and preferably a chloro group.

Ratios of hydrocarbon aluminum monohalide to transition metal halide are not narrowly critical because the III valence state metal compounds are solids and only a small percent of the solid particles is composed of metal atoms; and these metal atoms are only a portion of the amount of metal in the complex. Only enough hydrocarbon aluminum monohalide to activate these metal atoms is necessary. A wide range of ratios is shown in Table III. As is shown as low a ratio as a 2.15:1 of diethyl aluminum chloride to transition metal halide provides III valent metal containing catalysts. Other and lower ratios, e.g. 0.07:1 can also be used.

TABLE III

| Concentration $Et_2AlCl$: m. moles/liter | Mole Ratio: $Et_2AlCl$/ $TiCl_3$ | Polymer Productivity: g./ mmole $TiCl_3$ | Percent Amorphous | Intrinsic Viscosity | Catalyst Age, days |
|---|---|---|---|---|---|
| 15.4 | 2.15 | 0.762 | 0.86 | 4.87 | 47 |
| 17.4 | 2.65 | 0.845 | 0.00 | 7.73 | 50 |
| 26.6 | 3.96 | 1.25 | 0.56 | 6.70 | 59 |
| 27.2 | 4.22 | 1.20 | 0.12 | 5.55 | 60 |
| 41.2 | 6.03 | 1.67 | 1.17 | 4.74 | 53 |
| 42.0 | 6.34 | 1.72 | ---------- | ---------- | 54 |
| 66 | 9.80 | 2.48 | 1.17 | 9.18 | 52 |
| 65.8 | 9.92 | 2.26 | 1.04 | 7.11 | 51 |
| 68.5 | 10.33 | 2.52 | 1.67 | 6.06 | 60 |
| 103 | 16.05 | 3.35 | 0.85 | ---------- | 61 |
| 136.5 | 20.05 | 4.04 | ---------- | ---------- | 65 |
| 167.5 | 25.28 | 4.83 | 1.56 | ---------- | 66 |
| 195 | 28.88 | 5.45 | ---------- | ---------- | 69 |
| 200 | 29.35 | 5.35 | 1.29 | ---------- | 68 |
| 329 | 48.9 | 8.49 | 2.47 | ---------- | 70 |

Polymerization Conditions:
  Monomer: Propylene.
  Diluent: n-Heptane, ASTM Grade, 1,500 ml.
  Temperature: 40±1° C.
  Polymerization Time: 2½ hrs.

The catalyst components in either stage can be added to the reaction zone in any order. In continuous reaction systems independent streams, one of each of the components, can be advantageously fed into one end of the agitating-reacting zone. Rate of addition and contact times are not critical with contact times ranging from, for example, 30 seconds to 2 hours having been successfully used. Portions of one or the other of the catalyst components can be added to the whole of the other catalyst component. A highly convenient manner of addition of the hydrocarbon aluminum halide is with the α-olefin to be polymerized.

The temperature at which the catalyst preparation first and second stage is conducted is not critical. Generally speaking, the reaction can be effected at temperatures ranging from 0° C. to 200° C., and particularly 25 to 175° C. but temperatures higher or lower can be employed with success. It is preferred to conduct at least a portion of the reaction at temperatures over 100° C., to ensure complete utilization of the organo-aluminum compound.

The use of pressure is not required, except to keep liquid a volatile reaction solvent at elevated reaction temperatures, and will not ordinarily be used, since numerous organic solvents which are liquid at elevated temperatures are readily available.

The method of this invention is superior for the polymerization of alpha olefinically unsaturated hydrocarbons heretofore polymerized with Ziegler catalysts, especially those which have the general formula $$R_0-CH=CH_2$$

wherein $R_o$ is a saturated aliphatic, alicyclic or an aromatic radical, alone or in mixture with one another.

The practice of the present invention is illustrated by the following examples which are not intended to be nor should they be construed as limitative of the invention. All parts and percentages are by weight unless otherwise stated.

The apparatus used in the catalyst preparations were tested for adequate shear capacity by introducing 500 milliliters of heptane thereinto and agitating as if during catalyst preparation. Temperature rise was recorded at various intervals. The apparatus used in Example 1 had a calorie output rate of 100 calories per minute per liter which is preferred.

*Examples.—Catalyst preparation*

Pure n-decane was dried with nitrogen until the effluent nitrogen contained less than 3 p.p.m. of water. To about 400 g. of the n-decane there was added 75.48 g. of C.P. grade TiCl$_4$ and the solution blown under dry nitrogen into a dried, 1 liter, baffled resin kettle. The kettle was fitted with a 3″ Duplex Dispersator, a dropping funnel, thermometer, nitrogen source, and reflux condenser. The Dispersator was driven at 2000 r.p.m. and a solution of 28.00 g. of tri-iso-butyl aluminum in about 80 g. of n-decane was added dropwise over a period of 35 minutes. The temperature increased from 29° C. to 66° C. during the addition. The resulting slurry was agitated an additional 30 minutes at 64° C. and then was heated to 165° C. within 40 minutes, to 171° C. in another 10 minutes and to reflux (174° C.) in 10 more minutes. Heating was continued for an additional 45 minutes at reflux after which heat was removed so that the temperature was 90° C. in 40 minutes. The suspension was transferred in vacuo in an atmosphere of nitrogen. The product weighed 719.0 g. and had a nominal tri-iso-butyl aluminum to TiCl$_4$ ratio of 0.355:1.

*Control polymerization*

*Control I.*—1500 ml. of ASTM grade in heptane was dried to 3 p.p.m. of water in the effluent by a nitrogen and propylene purge. There was added to the heptane 1.32 g. diethyl aluminum chloride (11.0 mmole) and then 3.60 g. of the suspension obtained above (1.98 mmole of titanium halide). Polymerization of propylene was carried out by passing propylene gas at 40° C. and 7.5 p.s.i. gauge pressure into the heptane catalyst mixture for 2.5 hours. At the end of this period, the reaction mixture was quenched with 200 ml. of methanol and the whole poured into an additional 1500 ml. of an equivolume mixture of methanol and isopropanol. The polymer precipitate was filtered, washed and dried to constant weight. Yield was 13.29 g., equal to 6.70 g. per mmole of titanium halide. The filtrate was washed with 10% aqueous HCl, neutralized, dried and concentrated in vacuo. The residue was 120 mg. The dried polymer prepared was extracted with diethyl ether to exhaustion to give 1% solubles. The intrinsic viscosity of the ether-insoluble residue was 9.7.

*Example 1.*—The polymerization of the "control" was repeated except that ACS grade toluene was used in place of n-heptane. From 6.3 mmole diethyl aluminum chloride and 2.01 mmole of the titanium halide prepared as above there was obtained 27.9 g. of polymer of which 2.1% was ether soluble. The intrinsic viscosity of the ether insoluble residue was 11.0. The yield represents a catalyst productivity of 13.9 g. per mmole of titanium halide, more than double the yield in heptane, thus illustrating the increased catalytic effectiveness when an aromatic hydrocarbon is used as the polymerization medium.

In certain of the following polymerization triethyl aluminum was added in low ratios to the diethyl aluminum chloride co-catalyst. The amounts of catalyst components, polymer yields and amorphous contents are given in Table IV.

*Example 2.*—Fifteen hundred milliliters of ACS grade toluene was dried to 2 parts per million of water in the effluent by a nitrogen and propylene purge. There was added to the toluene 1.90 grams diethyl aluminum chloride (15.8 millimoles). There was then added 9.55 grams (5.09 millimoles) of the suspension obtained above (Example 1) to form the catalyst. Polymerization of propylene was carried out by passing propylene gas at 40° C. and 8 p.s.i. gauge pressure into the toluene/catalyst mixture for 2.5 hours. At the end of this period, the reaction mixture was quenched with 15 milliliters of methanol and the whole poured into an additional 2000 milliliters of methanol. The polymer precipitate was filtered and dried to constant weight. Yield was 49.7 grams, equal to 9.8 grams per millimole (mmole) of titanium halide. Nonvolatiles in the filtrate was 300 milligrams. Percent ether solubles of the dried polymer was 1.3%.

*Control III.*—Fifteen hundred milliliters of ASTM grade n-heptane was dried to 1.5 parts per million of water in the effluent by a nitrogen and propylene purge. There was added 1.99 grams diethyl aluminum chloride (16.5 millimoles); there was then added 9.80 grams (5.23 millimoles) of the suspension prepared in Example 1. Propylene was passed in the mixture at 40° C. and 8 p.s.i. gauge pressure for 15 minutes. Thereupon, there was added 1.49 millimole of triethyl aluminum as a dilute solution in n-heptane. Addition of propylene was continued for a total reaction time of 2.5 hours. The polymer was worked up as in Example 1. Yield was 48.3 grams of polypropylene, equal to 9.24 grams of polymer per millimole of titanium halide. The filtrate contained less than 100 millimoles of nonvolatiles. The polymer was extracted with diethyl ether. Percent ether solubles was 0.36%.

A comparison of Control II and Control III indicates that increased yields of polymer are obtained when small quantities of trialkyl aluminum compound are added when heptane is used as the polymerization diluent.

*Control IV.*—1500 milliliters of ACS grade toluene was dried to 2 parts per million of water in the effluent by a nitrogen and propylene purge. There was added 1.98 grams diethyl aluminum chloride (16.4 millimoles) and then 9.70 grams (5.16 millimoles) of the titanium halide suspension prepared in Example 1. Propylene was passed into the mixture at 40° C. and 8 p.s.i. gauge pressure for 15 minutes. Thereupon, there was added 1.37 millimole of triethyl aluminum as a dilute solution in n-heptane. Addition of propylene was continued for a total reaction time of 2.5 hours. Catalyst was quenched by addition of 10 milliliters of methanol. The polymer was filtered without precipitation and dried. The yield was 56.2 grams or 10.9 grams per millimole of titanium halide.

TABLE IV

|  | Control II | Control III | Example 2 | Control IV |
|---|---|---|---|---|
| Polymerization Diluent | n-Heptane | n-Heptane | Toluene | Toluene |
| TiCl₃, mmole | 5.02 | 5.23 | 5.09 | 5.16 |
| AlEt₂Cl, mmole | 15.92 | 16.50 | 15.80 | 16.40 |
| AlEt₃, mmole | 0 | 1.49 | 0 | 1.37 |
| Yield, g./mmole TiCl₃ | 6.28 | 9.24 | 9.80 | 10.90 |
| Percent Ether Soluble | 0 | 0.36 | 1.3 |  |

These data illustrate that when even a portion of the co-catalyst is a trihydrocarbon aluminum compound substantially equivalent results are obtained with an inert, liquid aliphatic hydrocarbon solvent or an inert liquid aromatic hydrocarbon solvent (Control III vs. Control IV), but when the co-catalyst is solely a dihydrocarbon aluminum halide the non-equivalency of aliphatic and aromatic hydrocarbons is demonstarted (Control II vs. Example 2).

What is claimed is:

1. In the method for polymerizing olefinically unsaturated hydrocarbon monomers having the formula $$R_o\text{---}CH\text{=}CH_2$$

wherein $R_o$ is a member selected from the class consisting of hydrogen, saturated aliphatic, alicyclic and aromatic hydrocarbon groups which comprises contacting said monomer with a highly geometrically uniform essentially spheroidal particulate organometallic catalyst having an average particle size between 200 and 300 Angstroms in diameter and wherein no appreciable number of particles exceeds 500 Angstroms, said catalyst having been produced from a co-catalyst comprising the fluid shear reaction product of (A) transition metal halides having the formula $$MO_aX_b$$

wherein M is a transition metal selected from the class consisting of metals of groups IVb, Vb and VIb of the Deming periodic table having a valence $z$ greater than 3 in the compound $MO_aX_b$; O is oxygen and X is halogen; $b$ is an integer having a value of 2 to $z$ and $a$ is an integer equal to $z-b/2$ and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen and a catalytically activating amount of a hydrocarbon aluminum monohalide compound free of aliphatic unsaturation, said fluid shear producing a heat output of at least 10 calories per minute per liter of agitated fluid, the improvement which comprises effecting the contacting in the presence of, as a diluent, an inert aromatic compound free of aliphatic unsaturation which is liquid under the polymerization conditions used.

2. Method claimed in claim 1 wherein the aromatic compound has a melting point below about 80° C.

3. Method claimed in claim 1 wherein the aromatic compound is toluene.

References Cited by the Examiner

UNITED STATES PATENTS 2,943,063  6/1960  Eby _____ 260—94.9
3,019,216  1/1962  Schmerling _____ 260—94.9

JOSEPH L. SCHOFER, *Primary Examiner.*

F. L. DENSON, *Assistant Examiner.*